United States Patent Office 3,485,806
Patented Dec. 23, 1969

3,485,806
HYDROXY SUBSTITUTED AMINIMIDES
Arnold E. Bloomquist, St. Louis Park, Edward A. Sedor, Bloom, and Robert C. Slagel, Savage, Minn., assignors to Ashland Oil & Refining Company, Houston, Tex., a corporation of Kentucky
No Drawing. Filed Feb. 7, 1968, Ser. No. 703,554
Int. Cl. C08f 3/90
U.S. Cl. 260—80.3                                    36 Claims

ABSTRACT OF THE DISCLOSURE

Compounds and polymers having a moiety of the formula:

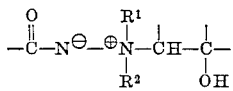

wherein $R^1$ and $R^2$ represent the same or different alkyl, cycloalkyl or aralkyl radicals or together represent a single divalent organic radical.

---

This invention relates to compounds, and polymers having at least one moiety of Formula I:

(I)    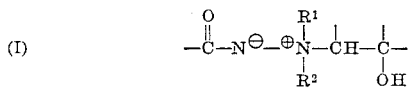

wherein $R^1$ and $R^2$ represent the same or different alkyl, cycloalkyl, or aralkyl radicals or together represent a single divalent organic radical.

The moiety of Formula I results from the coreaction of an epoxide, an unsymmetrical disubstituted hydrazine and a carboxylic acid ester. When the carboxylic acid ester contains addition polymerizable unsaturation the resultant monomers will be addition polymerizable to form polymers having the moiety of Formula I. When the carboxylic acid ester is pendant on the backbone of a polymer the resultant product will be a modified polymer containing a pendant moiety of Formula I attached to the polymer backbone by the carbonyl group.

A broad class of compounds having the moiety of Formula I are those of Formulae II, III and IV;

(II)    

(III)    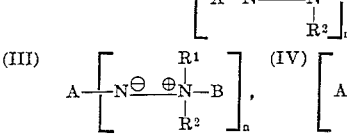    (IV)    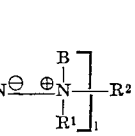

wherein $R^1$ and $R^2$ have the above defined meanings; A is a carboxylic acid residue attached to the indicated nitrogen atom by the carbonyl group of the acid; B is an epoxide residue in which the indicated nitrogen atom is attached to one carbon atom of the oxirane ring residue and in which the other carbon atom of the oxirane ring residue is attached to a hydroxyl group the oxygen atom of which being the original oxirane oxygen atom, wherein $l$, $m$ and $n$ are integers from 1 to 5 inclusive but are preferably 1.

Another class of compounds having the moiety of Formula I are those of Formula V:

(V)    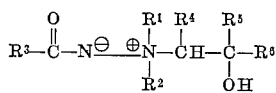

wherein $R^1$ and $R^2$ have the above described meaning; $R^3$ is an aliphatic, cycloaliphatic or aromatic radical such as alkyl, alkenyl, cycloalkyl, aryl, aralkyl or alkaryl; $R^4$, $R^5$, and $R^6$ are independently selected from the group consisting of hydrogen, alkyl, cycloalkyl, aryl, aralkyl and alkaryl and wherein any two radicals $R^4$ through $R^6$ can together represent a single divalent organic radical.

In a preferred embodiment $R^4$ and $R^5$ are hydrogen and $R^6$ is hydrogen, phenyl or alkyl, preferably lower alkyl.

When the compound having the moiety of Formula I contains an addition polymerizable ethylenic unsaturation such as a vinyl group, $CH_2=CH<$, the compounds are capable of being polymerized. A broad class of such compounds are those of Formula VI:

(VI)    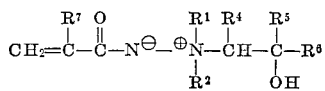

wherein $R^1$, $R^2$, $R^4$, $R^5$ and $R^6$ have the above described meanings and $R^7$ is H, Cl, F, Br, CN, or $-C_nH_{2n+1}$ where $n$ is an integer from 1 to 4 inclusive.

A preferred class of compounds are those of Formula V wherein at least one of the radicals $R^1$, $R^2$, $R^4$, $R^5$ or $R^6$ contains an active hydrogen and preferably wherein $R^1$, $R^2$, $R^4$, $R^5$ and/or $R^6$ are hydroxy alkyl, a preferred group of which are compounds of Formula VII:

(VII)    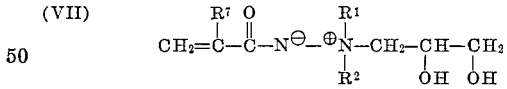

wherein $R^1$, $R^2$, and $R^7$ have the above described meanings. Active hydrogen is used in the sense defined by Zerewitinoff in 40 Berichte 2023 (1907) and 41 Berichte 2233 (1908) and includes amino ($-NH-$, $-NH_2$) groups and more preferably hydroxyl groups.

Suitable unsymmetrical disubstituted hydrazines are those of Formula VIII:

(VIII)
$$\begin{array}{c} R^1 \\ | \\ N\text{—}NH_2 \\ | \\ R^2 \end{array}$$

wherein $R^1$ and $R^2$ can be alkyl, cycloalkyl, or aralkyl radicals of 1 to 30 carbon atoms. Examples of suitable alkyl radicals include, among others, heptacosyl, cyclohexyl, t-butyl, isopropyl, ethyl, and methyl. Lower alkyl radicals are preferred. Examples of suitable aralkyl radicals include, among others, benzyl, 2-phenyl-propyl and 3-naphthylbutyl. When $R^1$ and $R^2$ together represent a single divalent organic radical, this radical can be a ring of 3 to 10, preferably 4 to 6, carbon atoms with the optional inclusion of one or two hetero atoms such as oxyen, sulfur, and nitrogen. Examples of suitable unsymmetrical disubstituted hydrazines include, among others, 1-allyl-1-benzylhydrazine, 1-cyclohexyl-1-ethylhydrazine, 1-aminopyrrolidine, 4 - aminomorpholine, 1-aminopiperidine, 1-amino-4-phenylpiperazine, aminohexamethylene imine, 1-amino - 4 - benzoylpiperazine, 1-aminoperhydroindole, 1-methyl-1-pentacosyl hydrazine, 1-ethyl-1-methyl hydrazine, and 1,1-dimethyl hydrazine which is most preferred because of its reactivity, cost and availability. Compounds such as 1,4-diamino piperazine having, in effect, two unsymmetrical hydrazine groups are also within the broad scope of the present invention, although they are preferably reacted with compounds having only one reactive epoxide group in order to inhibit condensation polymerization at this stage.

The particular epoxide employed in the present invention is not critical, although some are preferred, and a wide variety of compounds having at least one reactive epoxide group can be employed. By "reactive epoxide group" is meant a moiety of Formula IX:

(IX)
$$-\overset{|}{C}\overset{O}{\overset{\diagup\diagdown}{-}}\overset{|}{C}-$$

which is coreactive with the unsymmetrical disubstituted hydrazines of Formula VIII. The epoxide group of Formula IX can be internal, wherein each carbon atom of the oxirane ring is attached to at least one organic radical or, more preferably, are terminal, wherein at least one carbon atom is attached to two hydrogen atoms. These epoxides can be monoepoxides containing one reactive epoxide group, or polyepoxides containing a plurality of reactive epoxide groups, as well as other groups which do not, preferentially, react with the reactants employed in the present invention.

Examples of suitable monoepoxides include cyclohexene oxide as well as those of Formula X:

(X)
$$R^8\text{—}CH\overset{O}{\overset{\diagup\diagdown}{\text{—}}}CH_2$$

wherein $R^8$ is hydrogen, alkyl, aryl, aralkyl, or aralkyl such as ethylene oxide, propylene oxide, styrene oxide, glycidol, α-decyl oxide, α-pentadecyl oxide, and α-noncostly oxide.

Examples of suitable polyepoxides include those of Formulae XI through XVII, below:

(XI)
$$CH_2\overset{O}{\overset{\diagup\diagdown}{\text{—}}}CH\text{—}(CH_2)_n\text{—}CH\overset{O}{\overset{\diagup\diagdown}{\text{—}}}CH_2$$

wherein $n$ is an integer from 0 to 12 inclusive;

(XII)

(XIII)

wherein R is H or $CH_3$;

(XIV)
$$CH_2\overset{O}{\overset{\diagup\diagdown}{\text{—}}}CH\text{—}CH_2\text{—}O\text{—}(CH_2)_n\text{—}O\text{—}CH_2\text{—}CH\overset{O}{\overset{\diagup\diagdown}{\text{—}}}CH_2$$

wherein $n$ is an integer from 1 to 4 inclusive;

(XV)
$$\begin{array}{c} CH_2\text{—}O\text{—}CH_2\text{—}CH\overset{O}{\overset{\diagup\diagdown}{\text{—}}}CH_2 \\ | \\ CH_2OR \\ | \\ CH_2\text{—}O\text{—}CH_2\text{—}CH\overset{O}{\overset{\diagup\diagdown}{\text{—}}}CH_2 \end{array}$$

wherein R is H or $$-O\text{—}CH_2\text{—}CH\overset{O}{\overset{\diagup\diagdown}{\text{—}}}CH_2;$$

(XVI)

wherein $n$ is 2 or 3;

(XVII)
$$CH_2\overset{O}{\overset{\diagup\diagdown}{\text{—}}}CH\text{—}CH_2\text{—}O\text{—}\underset{}{\phantom{x}}\underset{\underset{CH_3}{|}}{\overset{\overset{CH_3}{|}}{C}}\underset{}{\phantom{x}}\text{—}O\text{—}CH_2\text{—}CH\overset{O}{\overset{\diagup\diagdown}{\text{—}}}CH_2$$

and the polymers thereof sold under the trade name "Epon." In general, these polymers are the reaction product of bisphenol-A and an epihalohydrin, preferably epichlorohydrin; and compounds such as (XVIII)
$$CH_2\text{—}CR\text{—}\overset{O}{\overset{\|}{C}}\text{—}NH\text{—}CH\text{—}CH\text{—}NH\text{—}\overset{O}{\overset{\|}{C}}\text{—}CR\text{—}CH_2$$
$$\underset{O}{\diagdown\diagup}\phantom{xxxxxx}\underset{OH}{|}\phantom{x}\underset{OH}{|}\phantom{xxxxxx}\underset{O}{\diagdown\diagup}$$

wherein R is H or lower alkyl and other similar compounds disclosed in British Patent 1,060,848.

The carboxylic acid esters of the present invention are those having at least one moiety of Formula XIX:

(XIX)
$$-\overset{O}{\overset{\|}{C}}-O-$$

and are coreactive with the hydrazines of Formula VIII. These esters generally contain saponifiable ester groups. Whether these ester groups are saponifiable can be easily determined by mixing the carboxylic acid ester with sodium hydroxide according to well-known procedures. A broad class of suitable esters are those of Formula XX:

(XX)
$$R^9O\text{—}\overset{O}{\overset{\|}{C}}\text{—}(R^{11})_r\text{—}\left[\overset{O}{\overset{\|}{C}}\text{—}OR^{10}\right]_n$$

wherein $R^9$ and $R^{10}$ are aliphatic, preferably alkyl and most preferably lower alkyl, and $R^{11}$ is an organic radical and preferably an aliphatic or aromatic radical such as alkylene, preferably lower alkylene, lower cycloalkylene, phenylene biphenyl or naphthylene, the preferred alkylene radical being $-\!(CH_2)\!-_m$, $m$ being an integer from 1 to 17 inclusive; wherein $r$ is 0 or 1; and $n$ is an integer from 0 to 4 inclusive and is preferably 0.

A broad class of esters suitable for the synthesis of monomers of Formulae VI and VII are those of Formula XXI:

(XXI)

wherein $R^7$ and $R^9$ have the above-described meanings.

The carboxylic acid esters can be monoesters or polyesters having a plurality of saponifiable ester groups. Examples of suitable monoesters include, among others, methyl acetate, ethyl propionate, t-butyl butyrate, propyl benzoate, methyl acrylate, methyl methacrylate, and glycidyl acrylate. Examples of suitable polyesters include, among others, dimethyl fumarate, diethyl maleate, diisopropyl terepthalate, di-t-butyl phthalate, dodecyl-methyl phthalate, methyl-ethyl itaconate, methyl oxalate, methyl-ethyl-malonate, 1,2,4 benzene tricarboxylic acid trimethyl ester, 2,6-naphthalene dicarboxylic acid dimethyl ester, as well as those of Formulae XXII through XXVI:

(XXII)
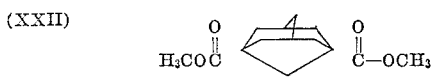

(XXIII)
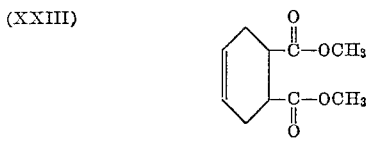

(XXIV)
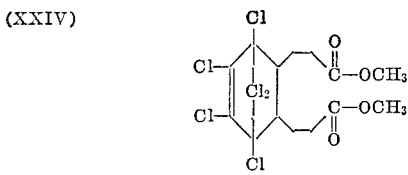

(XXV)
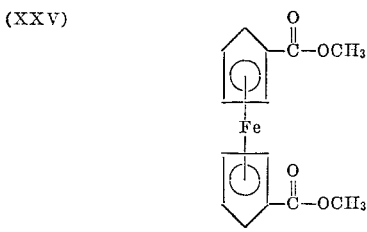

(XXVI)
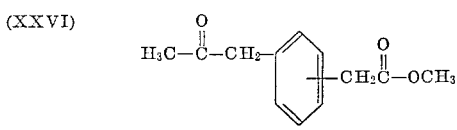

The compounds of the present invention such as those of Formulae II through VII are produced by mixing stoichiometric amounts of the hydrazine, the epoxide and the ester. Solvents are not necessary, but can be employed in amounts up to infinite dilution. Solvents such as benzene, water, ethers, and dimethyl sulfoxide can be employed, but the preferred solvents are the lower alkanols, examples of which include, among others, methanol, ethanol, t-butanol, and isopropanol, which is preferred. The reaction temperature is not critical and any temperature above that at which some degradation or pyrolysis takes place is suitable, and generally between 0° C. and 150° C., preferably between 20° C. and 80° C. The reaction times vary widely from about five minutes to about seven days, but preferably one hour to three days, depending upon the temperature, the lower temperatures requiring longer reaction times. While it is not desired to limit the present invention to any particular theory, the above-described reaction apparently proceeds according to Equation 1:

(Equation 1)
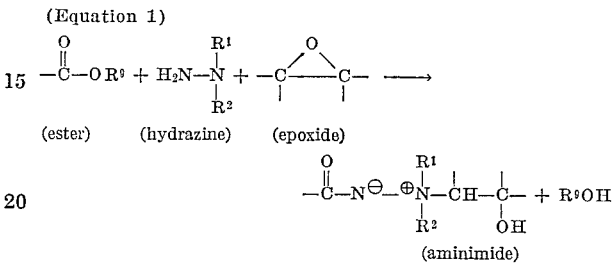

Alternatively, the epoxide can be reacted with a hydrazine in a first step to form a hydroxy aminimine as shown in Equation 2, and this hydroxy aminimine reacted with an ester as shown in Equation 3.

(Equation 2)
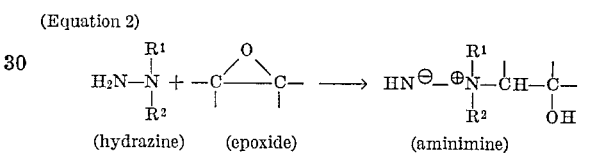

(Equation 3)
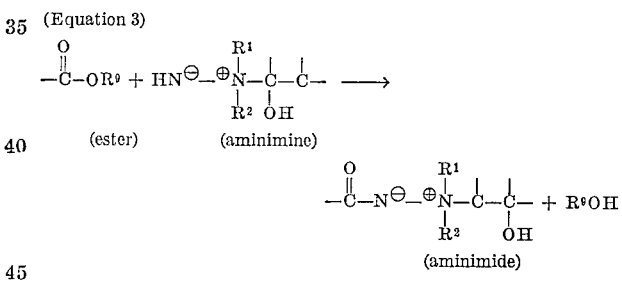

The monomers of Formulae VI and VII can be homopolymerized or random or block copolymerized with other monomers such as styrene or ethylenically unsaturated comonomers capable of copolymerizing with styrene examples of which include acrylonitrile; butadiene; methacrylates such as methyl methacrylate and hydroxyl propyl methacrylate, acrylates such as ethyl acrylate and methyl acrylate, acrylamide, vinyl chloride, vinyl fluoride, vinyl acetate, vinylidine chloride, vinylidene fluoride, ethylene and propylene. Polymerization is effected by well-known addition polymerization procedures and generally by mixing the monomer at temperatures of 0 to 150 preferably 30 to 90° C. in the presence of an addition polymerization catalyst such as $\alpha,\alpha'$-azo-bisisobutyronitrile or benzoyl peroxide for periods of 10 minutes to 24 hours, preferably 30 minutes to 6 hours, at atmospheric or when volatile reactants are employed superatmospheric pressures in solvents such as lower alkanols (e.g. t-butanol) in ratios of up to 1:1000 preferably 1:100 to 1:500 gram moles of monomer per milliliter of solvent. When other monomers are employed in addition to those of Formulae VI and VII they can be present in amounts of from less than one to over 99 weight percent, but are preferably present within this range based on the total weight of the mixture. The most preferred range is 2 to 20 weight percent monomer of Formula VI or VII or mixtures thereof. As is apparent these polymers have pendant hydroxy aminimide groups attached to the polymer backbone.

An alternative method of forming polymers having pendant hydroxy aminimide groups is to react an epoxide and an unsymmetrical disubstituted hydrazine with a preformed polymer having pendant carboxylic acid groups such as a polymer having the moiety of Formula XXVII:

(XXVII)

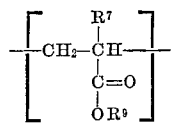

wherein $R^7$ and $R^9$ have the above described meanings, or pendant lactone groups as described in Palm et al., 5 Angew. Chem. Int. Ed. 994 (1966), examples of which include those of Formulae XXVIII and XXIX:

(XXVIII)

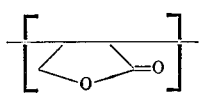

(XXIX)

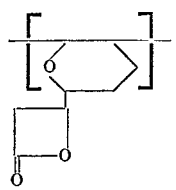

or those having an alkyl fumarate, maleate or p-vinyl benzoate in or attached to the polymer backbone. See British Patent 1,022,932.

The above described modification of the preformed polymer is effected by simply mixing the polymer, epoxide and unsymmetrical disubstituted hydrazine at temperatures of 0 to 150 preferably 20 to 80° C. wherein the epoxide and hydrazine are mixed in stoichiometric ratio and from 0.1 to 1 preferably 0.5 to 1 equivalents of the hydrazine per equivalent of pendant ester group are employed. The reaction can be conducted in the absence of a solvent or in up to infinite dilution of suitable solvents such as lower alkanols preferably present in a ratio of 1:100 to 1:500 gram equivalents of polymer per milliliter of solvent, at atmospheric, or when volatile reactants are employed, super atmospheric pressures.

The polymers of the present invention having pendant hydroxy aminimide groups whether formed by the addition polymerization of the monomers of Formulae V and VI or modification of preformed polymers can be pyrolyzed at temperatures above 120° C. and preferably from 140 to 200° C. to cause crosslinking. Pyrolysis is believed to cause rupture of the nitrogen-nitrogen bond of the hydrazine residue with formation of a β-hydroxy tertiary amine and an isocyanate group pendant to the polymer backbone as shown by Equation 4 wherein the wavy line (~) indicates a polymer backbone.

(Equation 4)

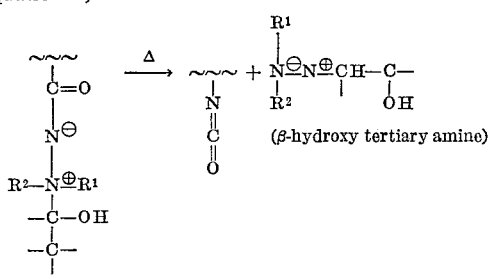

The pendant isocyanate group can then react with any active hydrogen such as one present in OH groups attached to other polymer backbones to crosslink the structure as shown in Equation 5 or with active hydrogens on the surface of the coated substrate to give increased adhesion.

(Equation 5)

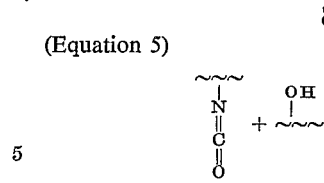

In that preferred embodiment of the present invention wherein the β-hydroxy tertiary amine contains in addition to the hydroxy group at least one other functional group having an active hydrogen the self crosslinking feature of the resultant polymers is enhanced on pyrolysis, as illustrated by Equations 6 and 7 employing an addition polymer of the monomer of Formula VII:

(Equation 6)

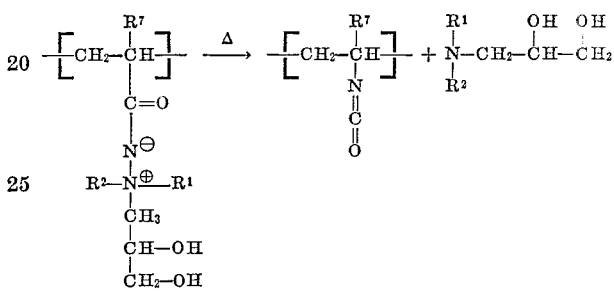

(Equation 7)

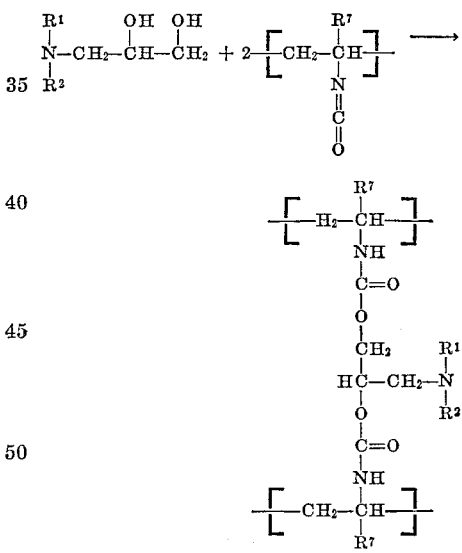

Except where otherwise indicated, the radicals $R^1$ through $R^{11}$ are preferably hydrocarbon radicals of up to 30 carbon atoms but can be substituted with one or more, preferably one to three, substituents which are substantially inert to the reactants employed in the process of the present invention. Examples of suitable substituents include, among others, hydroxyl, mercapto, and lower alkoxy such as methoxy. The reactants and therefore the radicals $R^1$ through $R^{11}$ should be substantially free of acid groups, such as carboxylic acid groups, which yield hydrogen ions in polar media.

Compounds having the moiety of Formula I such as those of Formulae II through VII can be pyrolyzed to produce isocyanaes of known utility. To prevent further reaction of the isocyanate and the β-hydroxy tertiary amine, the hydroxyl group of this amine can be capped prior to pyrolysis. Capping can be effected according to procedures well known in the art by mixing the compound or polymer with a monocarboxylic acid anhydride such as acetic anhydride or an isocyanate such as phenyl isocyanate. Additionally, these compounds can be employed as latent catalysts, which, upon pyrolysis will give tertiary amines which in turn are known to accelerate the reaction of polyols and polyisocyanates to produce polyurethanes or the reaction of bisphenol-A and epichlorohydrin to produce epoxy resins. Further, the aminimides have valuable utility as cross-linking monomers. When one of the radicals $R^1$ through $R^6$, and especially $R^3$ or $R^6$, are fatty, the compounds of Formula V find utility as surfactants, detergents, flotation agents and foaming agents. In particular, stable emulsions of carbon tetrachloride and water have been produced. Polymers having the pendant moiety of Formula I can be employed as decorative and/or protective coatings for substrates of wood, paper, ceramic, ferrous metals, non-ferrous metals, and the like. When applied by such procedures as dipping, brushing, or spraying, these coatings can be used to protect the coated substrate from the adverse effects of weather, water, and air. Thus, such useful objects as boats, chairs, and houses can be advantageously coated with these novel compositions. Copolymers of the novel hydroxyaminimides can be used as textile fibers or as additives to textiles to increase dye affinity. Pyrolysis of such textiles may provide permanent press properties by formation of polyurethanes. Other possible uses of these novel materials are as growth regulators for food crops and/or herbicides (when polymerized), as adhesives and binders, and as reversible gels.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention. In the following examples, "IR" means infrared or infrared spectrum; "VPC" means vapor phase chromatograph; "TLC" means thin layer chromatograph; "TGA" means thermogravimetric analysis; "mdpt." means midpoint; "DTA" means differential thermal analysis; "endo" means endothermic heat absorption by the sample and "exo" means exothermic heat release by the sample; "NMR" means nuclear magnetic resonance; and "M.P." means melting point.

Example 1

This example illustrates the synthesis of a novel compound of Formula XXX:

(XXX)
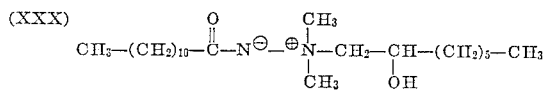

22.8 g. (0.1 mole) of ethyl laurate and 6.0 g. (0.1 mole) 1,1-dimethyl hydrazine were dissolved in 100 ml. of dry +OH and heated to 68° C. 12.8 g. (0.1 mole) of 1-octene oxide (97.5%; oxirane content 12.2) was added slowly. The resulting pale yellow solution was allowed to stir at 68° C. for 2 hours. A small sample was taken and the solvent evaporated in vacuo. The IR shows a band at 1570 cm.$^{-1}$ indicating the presence of the aminimide; unreacted ester shows as well.

After standing over the weekend the mixture was heated for 4 more hours. Ester still remained but the aminimide peak at 1570 cm.$^{-1}$ in the IR spectrum had increased considerably. About 1 gm. more of 1,1-dimethyl hydrazine was added and the mixture heated for another 2 hours. By infrared and VPC very little more ester had reacted. The reaction was stopped and the solvent stripped in vacuo leaving 40 g. of a yellow oil. Cooling in a freezer gave crystals and a viscous oil. Hexane was added and the mixture filtered to give a white sticky solid. Recrystallization in hexane (Skelly B) gave a first crop at room temperature which possessed an IR peak at 1560 cm.$^{-1}$ (aminimide) and also a weak peak at 1650 cm.$^{-1}$.

The filtrate was cooled to give a white crystalline solid, M.P. 48–52° C. which showed a carbonyl only at 1570 cm.$^{-1}$ plus OH at 3150 cm.$^{-1}$ in the IR spectrum. Several more recrystallizations from hexane gave M.P. 51.5–54.5° C. The total yield of crude solid product was 23 g. or 62%.

Analysis.—Calcd. for $C_{22}H_{46}N_2O_2$ (370.61): C, 71.29; H, 12.51; N, 7.56. Found: C, 71.30; H, 12.55; N, 7.68.

The NMR (CCl$_4$, $\tau$) shows peaks at: 9.11 (triplet (CH$_3$)), 8.72 (singlet, CCH$_2$—C),

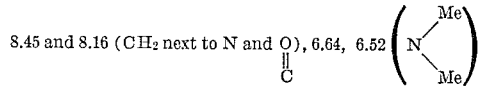

6.02 (CH—OH) and 3.73 (OH) p.p.m. The DTA shows an endotherm at 50° C., exotherm at 184° C., and small endo at 295° C. The TGA shows an onset at 152° C. and a mdpt. at 203° C. with a 96.4% wt. loss. On heating the compound to 260° C. in a sealed M.P. tube the compound rearranged and gave the urethane as evidenced by the IR spectrum showing peaks at 3340 (NH), 1720, 1620, etc. cm.$^{-1}$.

Example 2

This example illustrates the synthesis of a novel compound of Formula XXXI:

(XXXI)
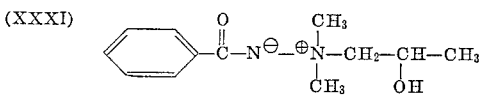

A mixture of 13.6 g. (0.1 mole) methyl benzoate, 6.0 g. (0.1 mole) 1,1-dimethyl hydrazine and 5.8 g. (0.1 mole) propylene oxide in 75 ml. dry t-butanol were placed in a pressure bottle with a magnetic stirrer and sealed. The mixture was allowed to stir at room temperature for 16 hours. A small sample was removed and the solvent evaporated in vacuo. The IR spectrum showed both ester carbonyl at 1720 cm.$^{-1}$ and peaks typical to trimethylamine-benezimide at 1600 and 1560 cm.$^{-1}$.

The remaining reaction mixture was allowed to continue to stir at room temperature. After 22 hours the ester band in IR was further diminished. After 4 days the reaction was evaporated in vacuo to give 20.9 g. (94.8%) of a white solid. Three recrystallizations from ethyl acetate gave white crystals, M.P. 122–5° C.

Analysis.—Calcd. for $C_{12}H_{18}N_2O_2$ (222.28): C, 64.84; H, 8.16; N, 12.61. Found: C, 65.20; H, 8.11; N, 12.71.

TGA shows 94.5% decomposition (wt. loss) onset at 168° C., mdpt. 211° C.: DTA sample slightly hydroscopic, endo 119° C., exo at 180° and 203° C. NMR spectrum (CDCl$_3$,$\tau$) doublet at 8.83, peaks at 6.77, 6.71, 6.63, 6.25 (CH$_2$—N), 6.51 (CH$_3$—N), mult at 5:68 (CH—OH), singlet at 3.53 (OH) and aromatic 2–3 p.p.m. 4 g. of the aminimide were pyrolyzed at 165–190° C. to give 1.6 g. (theory=1.86 g.) of a colorless oil. Redistillation on a microhickman gave an IR identical to authentic Me$_2$NCH$_2$CHOHCH$_3$, $n_D^{25}$ 1.4203. The VPC retention time (6 ft. DC–LSX column) was identical to the known material.

Example 3

This example illustrates the synthesis of a novel compound of Formula XXXII:

(XXXII)
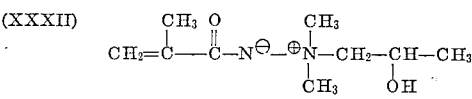

10.0 g. (0.1 mole) methylmethacrylate, 6.0 g. (0.1 mole) 1,1-dimethyl hydrazine and 5.8 g. (0.1 mole) of propylene oxide were mixed with 75 ml. dry t-butanol and stirred at room temperature in a sealed pressure bottle for 64 hours. Very little methmethacrylate remained (by VPC). The solvent was evaporated in vacuo at 60° C. to give 17 g. (91.5%) of a white solid. Three recrystallizations from ethyl acetate gave M.P. 146.5–147.5° C. The IR showed peaks at 3150, 3100, 3050, 3025 (all weak) and at 1650 (s.) and 1580 vs.) cm.$^{-1}$.

*Analysis.*—Calcd. for $C_9H_{18}N_2O_2$: C, 58.00; H, 9.73; N, 15.10. Found: C, 58.13; H, 9.68; N, 15.14. Sample is not hygroscopic.

NMR ($CDCl_3,\tau$): doublet 8.78, d. at 8.12, peaks at 6.69, 6.63, 6.58, 6.18 (N—$CH_2$), 6.43 (N—$CH_3$), 5.63 ($\overset{|}{\underset{|}{C}}H$—) mult 4.92 and 4.28 ($CH_2$=C) mult, and 3.35 (OH) p.p.m.

DTA: endo at 141° C., exo at 160 and 181° C.

TGA: onset 140° C. complete wt. loss at 198° C.

Example 4

This example illustrates the synthesis of additional novel compounds of the formulae shown in Table 1 and summarizes data of compounds of Formulae XXX through XXXII.

These compounds are synthesized by reacting 1,1-dimethyl hydrazine with the indicated epoxide, and the methyl ester of the acid having the indicated radical R' according to the general procedure of Example 1.

TABLE I.—PROPERTIES OF AMINIMIDES AND DATA ON THEIR FORMATION $$R'-\overset{O}{\underset{}{C}}-\overset{\ominus}{N}-\overset{R''}{\underset{R''}{\overset{\oplus}{N}}}-CH_2\overset{OH}{\underset{}{C}}HR \text{ a}$$

| 1 | 2 | 3 | 4 | 5 | 6 |
|---|---|---|---|---|---|
| | R' | R | Solvent and Temperature, ° C. | Percent yield | M.P., ° C. |
| Formula: | | | | | |
| XXXIII | $CH_3CH_2$ | $CH_3$ | Isopropanol, 23 | 96 | 108.5–110 |
| XXXIV | $CH_3(CH_2)_{10}$ | $CH_3$ | ___do___ | Quant. | 48–50 |
| XXX | $CH_3(CH_2)_{10}$ | $CH_3(CH_2)_5$ | t-Butanol, 68 | 62 | 51.5–54.5 |
| XXXV | $CF_3$ | $CH_3$ | Isopropanol, 23 | 89 | 109–110 |
| XXXVI | $CF_3CF_2$ | $CH_3$ | ___do___ | 90.5 | 101–102 |
| XXXII | $CH_2$=C($CH_3$) | $CH_3$ | ___do___ | 98 | 146.5–147.5 |
| XXXVII | $CH_2$=C($CH_3$) | H | t-Butanol, 23 | 88 | 78–80 |
| XXXVIII | $CH_2$=C($CH_3$) | $CH_3(CH_2)_9$ | Isopropanol, 23 | Quant. | 64–66 |
| XXXIX | $CH_2$=C($CH_3$) | $CH_3$ | ___do___ | 95 | 93–95 |
| XXXI | Ph | $CH_3$ | t-Butanol, 23 | 94 | 122–125 |
| XL | Ph | Ph | ___do___ | 90 | 146–147 |
| XLI | Ph | (d) | t-Butanol, 55 | 55 | 182–183 |
| XLII | [norbornenyl structure] | $CH_3$ | Isopropanol, 60 | 80 | d 171 |
| XLIII | $(EtO)_2P(Q)(CH_2)_2$ | $CH_3$ | t-Butanol, 23 | Quant. | Oil. |
| XLIV | [pyridyl structure] | $CH_3$ | Isopropanol, 23 | Quant. | 116–118 |
| XLV e | —$(CH_2)_4$— | $CH_3$ | t-Butanol, 23 | Quant. | 191–192 |
| XLVI e | [tetrachlorobenzene structure with —$(CH_2)_2$— groups] | $CH_3$ | Isopropanol, 23 | Quant. | d 212 |

| 1 | 7 | 8 | 9 | 10 | 11 | 12 | 13 | 14 | 15 | 16 |
|---|---|---|---|---|---|---|---|---|---|---|
| | TGA,b ° C. | | IR absorption,c cm.$^{-1}$ | | Elemental Anal. | | | | | |
| | | | | | Calcd. | | | Found | | |
| | Onset | Mdpt. | $\overset{O}{C-N}$ | O-H | C | H | N | C | H | N |
| Formula: | | | | | | | | | | |
| XXXIII | 135 | 195 | 1,600 | 3,150 | 55.14 | 10.41 | 16.08 | 54.99 | 10.31 | 16.20 |
| XXXIV | 155 | 203 | 1,570 | 3,250 | 67.94 | 12.07 | 9.32 | 68.27 | 12.46 | 9.40 |
| XXX | 152 | 203 | 1,570 | 3,150 | 71.29 | 12.51 | 7.56 | 72.30 | 11.55 | 7.58 |
| XXXV | 165 | 230 | 1,650 | 3,270 | 39.31 | 6.11 | 13.08 | 38.84 | 5.96 | 12.74 |
| XXXVI | 130 | 218 | 1,660 | 3,380 | 36.37 | 4.96 | 10.61 | 36.20 | 4.87 | 10.66 |
| XXXII | 140 | 185 | 1,580 | 3,130 | 58.00 | 9.73 | 15.10 | 58.13 | 9.68 | 15.14 |
| XXXVII | 139 | 188 | 1,550 | 3,120 | 55.78 | 9.36 | 16.26 | 56.05 | 9.18 | 16.25 |
| XXXVIII | 155 | 187 | 1,555 | 3,225 | 69.17 | 11.61 | 8.96 | 69.30 | 11.51 | 9.07 |
| XXXIX | 140 | 176 | 1,555 | 3,170 | 64.96 | 10.06 | 11.66 | 64.73 | 10.12 | 11.74 |
| XXXI | 168 | 211 | 1,580 | 3,125 | 64.84 | 8.16 | 12.61 | 65.20 | 8.11 | 12.74 |
| XL | 162 | 195 | 1,560 | 3,090 | 71.80 | 7.09 | 9.85 | 71.89 | 7.12 | 9.81 |
| XLI | 175 | 208 | 1,560 | 3,180 | 68.66 | 8.45 | 10.74 | 68.42 | 8.22 | 10.81 |
| XLII | | | 1,570 | 3,150 | 68.53 | 10.06 | 9.99 | 68.38 | 10.05 | 9.83 |
| XLIII | | | 1,600 | 3,340 | 46.44 | 8.77 | 9.03 | 45.75 | 8.70 | 8.84 |
| XLIV | 175 | 225 | 1,560 | 3,325 | 59.17 | 7.68 | 18.82 | 59.38 | 7.62 | 18.85 |
| XLV e | 165 | 230 | 1,570 | 3,100 | 55.46 | 9.89 | 16.17 | 55.21 | 9.87 | 16.29 |
| XLV e | 205 | 277 | 1,565 | 3,100 | 42.80 | 5.62 | 8.68 | 42.50 | 5.64 | 8.65 | a R''=R'''=$CH_3$ in all cases except Run No. 9 where R'' and R''' together are $(CH_2)_5$.
b Run on a DuPont 950 Thermogravimetric analyzer at 20° per min. in nitrogen.
c Run as mulls on a Perkin Elmer 237B grating spectrophotometer.
d Epoxide used was cyclohexene oxide.
e The bisaminimides.

Example 5

The procedure of Example 4 is repeated except that the 1,1-dimethyl hydrazide is replaced successively by 1-ethyl-1-benzyl hydrazine, 4-aminomorpholine and 1-aminopyrrolidine with similar results.

Example 6

This example illustrates the synthesis of additional compounds of the present invention of the formulae shown in Table II.

Following the procedure of Example 1 1,1-dimethyl hydrazine is reacted with the epoxide of column 3 and the ester of column 4 to produce the compound having the formula shown in column 2, and possessing the properties shown in columns 5 through 12.

Example 7

This example illustrates the synthesis of a homopolymer of the monomer of Formula LII.

The monomer (4.0 g.) is dissolved in 30 ml. distilled water and placed in a 100 ml. 4 neck bantam-ware flask equipped with a stirrer, thermometer, reflux condenser and a nitrogen inlet. Nitrogen is bubbled into the water solution for 30 min. where upon 4 mg. of VAZO dissolved in 2 ml. acetone is added. The bubbling of nitrogen is continued for about 15 minutes. The temperature is then increased to 82° C. and maintained for 4 hours while under nitrogen. A small sample is removed and a white solid, M.P. 300° C. is precipitated out with acetone. The infrared spectrum shows loss of double bond. Heating is continued for 1 hour whereupon the flask and contents

TABLE II

| 1 | 2 | 3 Epoxide (desig.)[1] | 4 Ester (desig.)[2] |
|---|---|---|---|
| XLVII | 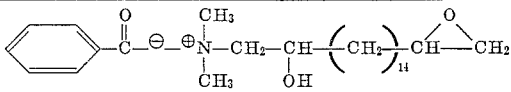 | OD | MB |
| XLVIII | 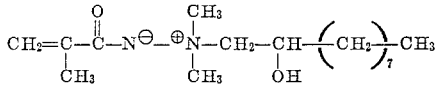 | DO | MM |
| XLIX | 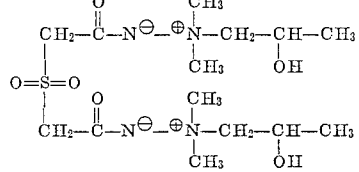 | PO | SM |
| L | 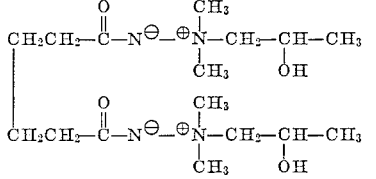 | PO | DA |
| LI | 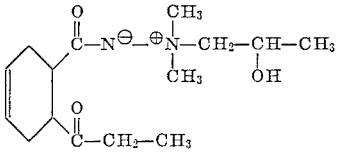 | PO | DTP |
| LII | 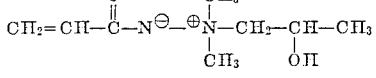 | PO | MA |
| LIII | 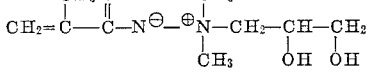 | G | GM, MM |

| 1 | Analysis (wt. percent) | | | | | | IR Spectrum (cm.$^{-1}$) | |
|---|---|---|---|---|---|---|---|---|
| | Calculated | | | Found | | | 11 | 12 |
| | 5 | 6 | 7 | 8 | 9 | 10 | C=O | —CH— |
| | C | H | N | C | N | N | N | OH |
| XLVII | 66.33 | 8.55 | 9.14 | 66.56 | 8.98 | 10.51 | 1,560 | 3,280 |
| XLVIII | 69.17 | 11.61 | 8.96 | 69.30 | 11.51 | 9.07 | 1,550 | 3,225 |
| XLIX | | | | | | | 1,620 | 3,390 |
| XL | 55.46 | 9.89 | 16.17 | 55.21 | 9.87 | 16.29 | 1,570 | 3,100 |
| LI | | | | | | | 1,600 | 3,300 |
| LII | | | | | | | 1,580 | 3,300 |
| LIII | | | | | | | 1,550 | Broad 3,300 |

[1] EO is ethylene oxide; PO is propylene oxide; CO is cyclohexene oxide; DO is dodecane oxide, OD is 1,7-octadiene diepoxide, and G is glycidol.

[2] MB is methyl benzoate, MM is methyl methacrylate; DA is diethyl adipate, MA is methyl acrylate; SM is sulfone bis methyl acrylate; DTP is diethyl tetrahydrophthalate and GM is glycidyl methacrylate.

are cooled to room temperature. The contents are filtered into 100 ml. of stirred acetone. The white precipitate is washed with acetone four times yielding 3.3 g. of a white solid. The white solid (1.08) is dissolved in a minimum of $H_2O$, reprecipitated with acetone, filtered and washed with acetone then dried in vacuo at 65° C. The NMR spectrum shows loss of vinyl protons. DTA shows exo at 172° C. TGA shows onset 155° C. mdpt. 175° C.; onset 260° C. mdpt. 365° C.

*Analysis.*—Calcd. for $C_9H_{18}O_2$: C, 58.00; H, 9.73; N, 15.10. Found: C, 55.79; H, 9.60; N, 14.46.

Example 8

This example illustrates the synthesis of a copolymer of methylmethacrylate and the monomer of Formula LII.

Into a 4 neck 100 ml. bantam-ware flask equipped with a condenser, stirrer, thermometer and nitrogen inlet tube were placed 2.0 g. of the monomer of Formula LII and 6.6 g. of methylmethacrylate in 60 ml. acetonitrile. The contents of the flask are purged with nitrogen for about 30 minutes and 9 mg. of $\alpha,\alpha'$-azobisisobutyronitrile ("VAZO") dissolved in 1 ml. of acetone. The temperature is increased to 75° C. and maintained for 5 hours under nitrogen. The flask and its contents are allowed to stand at room temperature overnight. The reaction mixture is concentrated to dryness using a flash evaporator to recover 4.5 g. of a white solid. The IR spectrum shows ester carbonyl at 1725 and aminimide carbonyl at 1580 cm.$^{-1}$ and little if any vinyl proton absorption. 2 g. of the white solid are dissolved in acetone, filtered and poured into distilled water. A white precipitate comes out which is dried in vacuo at 65° C.

*Analysis.*—The NMR spectrum integration indicates a ratio of 10 methylmethacrylates/1 aminimide. Calcd. for $C_{59}H_{96}N_2O_{22}$: C, 59.77; H, 8.16; N, 2.36. Found: C, 60.0; H, 8.00; N, 2.30. TGA onset 125° mdpt. 175°, weight loss 0.21 mg./2.02 or 10.5% DTA exo 183° endo 357°.

The polymer is dissolved in chloroform, spread onto a glass plate, and air dried to form a film. The film is then pyrolyzed at 160° C. for ½ hour. An IR spectrum shows loss of aminimide absorption at 1580 cm.$^{-1}$ and the appearance of isocyanate absorption at 2250 cm.$^{-1}$. The resultant film is hard and brittle (Sward No. of 56).

Example 9

This example illustrates the synthesis of a homopolymer of the monomer of Formula LIII.

To a serum bottle is added 3 g. of the monomer of Formula XLVII, 0.3 g. of $\alpha,\alpha'$-azobisisobutyronitrile in 20 ml. methanol, and 25 ml. acetonitrile. After purging the solution for 15 minutes with nitrogen the bottle is sealed and placed in an oil bath controlled at 70° C. After 72 hours the solution is cooled and poured into 200 ml. of ether forming a white precipitate which is twice washed with additional ether. The white precipitate is then redissolved in water and reprecipitated from acetone. The IR spectrum indicates loss of vinyl hydrogens.

The above is repeated using 3 g. monomer, 0.05 $\alpha,\alpha'$-azobisisobutyronitrile in 50 ml. of distilled water, using 10 ml. of methanol to dissolve the $\alpha,\alpha'$-azobisisobutyronitrile. After purging with nitrogen the solution is heated at 70° C. for three days. Precipitation from acetone gives a white solid, wt. 2 g.

*Analysis.*—Calcd. for $C_7H_{12}N_2O_3$: N, 13.85. Found: N, 13.29.

Example 10

This example illustrates the synthesis of a copolymer of methyl methacrylate and the monomer of Formula LIII.

In a serum bottle (125 ml.) is placed 10 g. of methyl methacrylate, 5 g. of the monomer of Formula LIII, 0.2 g. of $\alpha,\alpha'$-azobisisobutyronitrile, 50 ml. of acetonitrile and 5 ml. of methanol. After purging for 15 minutes with nitrogen, the bottle is sealed and placed in a oil bath at 75° C. for 60 hours. The solution is then cooled and poured with stirring into 500 ml. of anyhydrous ether and a white solid collected by filtration and dried in vacuo at 25° C. Weight of the polymer is 14.0 g. TLC shows no trace of monomer; IR spectrum shows OH (3350 cm.$^{-1}$), ester 1720 cm.$^{-1}$, amine imide 1570 cm.$^{-1}$, but no vinyl group. The polymer is dissolved in 50 ml. of chloroform and precipitated from ether, weight 13.0 g. after drying. Calcd. for a 5:1 methyl methacrylate to aminimide ratio gave 3.95% N. Found: 3.86%.

Example 11

This example illustrates the synthesis of a homopolymer of the monomer of Formula LII.

The monomer of Formula LII (2.07 g.) (crude) is dissolved in 50 ml. of distilled water and placed in a serum bottle. The bottle is purged with nitrogen for ½ hour and 0.20 g. of $\alpha,\alpha'$-azobisisobutyronitrile dissolved in 1 ml. of acetone. The bottle is purged with nitrogen for 5 minutes and sealed. The bottle and contents are heated in an oil bath at 80° C. for 6 hours and allowed to cool to room temperature. The reaction mixture is filtered into 400 ml. of acetone. A brown viscous oil falls out. The oil is washed twice with 100 ml. portions of acetone and twice with 100 ml. portions of ether. About 5 g. of a brown viscous oil is recovered. IR spectrum (neat) shows loss of carbon-carbon double bond but the aminimide carbonyl at 1580 cm.$^{-1}$ is sharp and strong.

Example 12

The example illustrates the synthesis of polymers of the present invention produced from an acrylate polymer, 1,1-dimethylhydrazine and propylene oxide.

The acrylic polymer used is a 60/25/15 random copolymer of butyl acrylate, methylmethacrylate and styrene. Into a 1 liter flask are placed 88.5 g. of the acrylic polymer and 350 ml. isopropanol. Upon solution of the polymer, 38.2 g. of 1,1-dimethyl hydrazine and 37.1 g. propylene oxide are added with stirring. The resulting mixture is allowed to stir for 40 hours at room temperature. An infrared spectrum shows both ester and aminimide carbonyl adsorption of about equal intensities. The solvent is evaporated in vacuo giving 188.5 g. of modified polymer (some solvent still remains trapped in the polymer). Titration of the polymer in glacial acetic acid with perchloric acid to a Gentian Violet end point shows one aminimide group per 224 units of molecular weight.

The modified polymer is redissolved in a 2:3 mixture of xylene-isopropanol to give a 40% solids solution. A glass plate is spread (0.03 mm. spreader) with the solution and allowed to air dry to form a film. A second plate is treated in a similar fashion with the unmodified acrylic polymer. The films are then baked in the oven as follows:

|  | 100° C. 14 hours | 100° C. 3 hours, 160° C. 2 hours |
|---|---|---|
| Modified polymer | Hard (28 Sward) | Hard (55 Sward). |
| Unmodified polymer | Tacky | Tacky. |

An infrared spectrum of the modified polymer baked at 100° C. for 2 hours shows ester (1740 cm.$^{-1}$) and aminimide (1580 cm.$^{-1}$) carbonyl and isocyanate (2160 cm.$^{-1}$) absorption. When baked at 160° for 2 hours the aminimide carbonyl and isocyanate absorption disappear and a broad band from 1740–1675 cm.$^{-1}$ (ester and amide) appears indicating the formation of urethane and/or urea linkages.

Example 13

This example illustrates the synthesis of polymers of the present invention produced from an acrylate polymer, 1,1-dimethylhydrazine and glycidol. The same polymer and procedure of Example 12 are used except that glycidol is used in place of propylene oxide. The amounts are 35.4 g. polymer, 15.1 g. 1,1-dimethyl hydrazine and 19.1 g. glycidol in 100 g. isopropanol. The reaction proceeds one week at room temperature whereupon evaporation of the solvent in vacuo yields 88.7 g. of viscous oil (some of solvent is entrained in the polymer). Titration with perchloric acid as before shows the polymer contains 1 aminimide group per 300 units of molecular weight.

The polymer is redissolved in isopropanol to give a solution with 44% solids. A film of this solution is spread on glass plate and air dried. The film is then baked at 100° C. for 1 hour but is still tacky. After baking at 160° for 1 hour the film becomes hard (34 Sward). The infrared spectra after 1 hour at 100° C. and 1 hour at 160° C. compares to those described in Example 12.

Example 14

This example illustrates the modification of a preformed polymer having pendant carboxylic acid ester groups by reacting the polymer with an unsymmetrical disubstituted hydrazine and a polyepoxide.

To 15.3 g. of a polymer, containing 60 parts butylacrylate, 25 parts methylmethacrylate and 15 parts styrene, in 30 g. isopropanol was added 6.0 g. of 1,1-dimethyl hydrazine and 7.1 g. 1,2,7,8-diepoxyoctane. The reaction was allowed to proceed at room temperature overnight. An IR spectrum of the reaction mixture shows a strong aminimide absorption at 1580 cm.$^{-1}$.

A 3 mil thick film of the reaction mixture was spread on a glass plate. After baking at 55° C. for 4 hours a tacky slightly yellow film resulted. Baking at 105° C. for an additional hour gave similar results. After 1 to 5½ hours at 160° C. the film, now yellow-brown, showed a drastic decrease in absorption at 1580 cm.$^{-1}$ with appearance of absorption at 1700 cm.$^{-1}$ attributed to urethane formation. The resulting film had a pencil hardness of HB and adhered well to glass.

Although the invention has been described in considerable detail with reference to certain preferred embodiments thereof, it will be understood that variations and modifications can be effected within the spirit and scope of the invention as described above and as defined in the appended claims.

What is claimed is:

1. A compound having the formula:

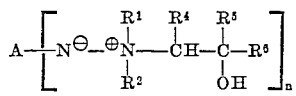

wherein:
$R^1$ and $R^2$ represent the same or different alkyl, cycloalkyl or aralkyl radicals or together represent the single divalent organic radical;
$R^4$, $R^5$ and $R^6$ are independently selected from the group consisting of hydrogen, alkyl, cycloalkyl, aryl, aralkyl, and alkaryl and wherein any two can together represent a single divalent organic radical;
A is a carboxylic acid residue attached to the indicated nitrogen atom by the carbonyl group of the acid; and,
$n$ is an integer of from 1 to 5, inclusive.

2. The compound of claim 1 wherein $R^1$ and $R^2$ are lower alkyl and $n$ is 2.

3. The compound of claim 2 wherein $R^1$ and $R^2$ are methyl.

4. A compound having of the formula:

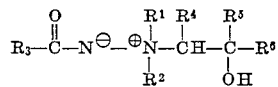

wherein:
$R^1$ and $R^2$ represent the same or different alkyl, cycloalkyl or aralkyl radicals or together represent a single divalent organic radical and,
$R^3$ is an aliphatic, cycloaliphatic or aromatic radical;

$R^4$, $R^5$, and $R^6$ are independently selected from the group consisting of hydrogen, alkyl, cycloalkyl, aryl, aralkyl, and alkaryl and wherein any two can together represent a single divalent organic radical.

5. The compound of claim 4 wherein:
$R^3$ is alkyl, aryl, aralkyl, alkaryl, or alkenyl;
$R^4$ and $R^5$ are each hydrogen;
$R^6$ is hydrogen, phenyl or alkyl.

6. The compound of claim 5 wherein:
$R^1$ and $R^2$ are lower alkyl;
$R^3$ is lower alkyl, phenyl or benzyl;
$R^6$ is hydrogen or lower alkyl.

7. A compound having the formula:

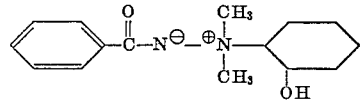

8. A compound having the formula:

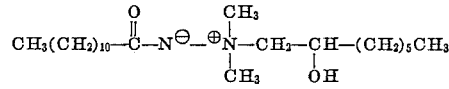

9. A compound having the formula:

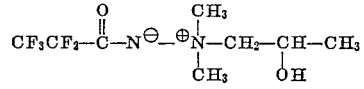

10. A compound having the formula:

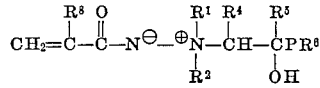

wherein:
$R^1$ and $R^2$ represent the same or different alkyl, cycloalkyl or aralkyl radicals or together represent a single divalent organic radical and,
$R^4$, $R^5$, and $R^6$ are independently selected from the group consisting of hydrogen, alkyl, cycloalkyl, aryl, aralkyl, and alkaryl and wherein any two can together represent a single divalent organic radical.
$R^8$ is H, Cl, F, Br, Cn or $-C_nH_{2n+1}$ where $n$ is an integer from 1 to 4 inclusive.

11. A compound having the formula:

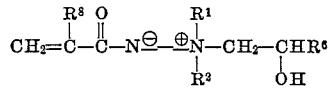

wherein:
$R^1$ and $R^2$ are lower alkyl;
$R^8$ is H, Cl, F, Br, Cn or $-C_nH_{2n+1}$ where $n$ is an integer from 1 to 4 inclusive;
$R^6$ is hydrogen, phenyl or alkyl.

12. The compound of claim 11 having the formula:

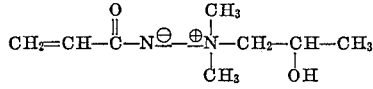

13. The compound of claim 11 having the formula:

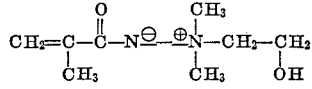

14. The compound of claim 11 having the formula:

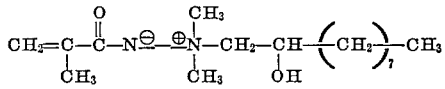

15. A compound of claim 10 wherein at least one of the radicals $R^1$, $R^2$, $R^4$, $R^5$ or $R^6$ contains an active hydrogen atom.

16. A compound of claim 10 wherein at least one of the radicals $R^1$, $R^2$, $R^4$, $R^5$ or $R^6$ is hydroxy alkyl.

17. A compound having the formula:

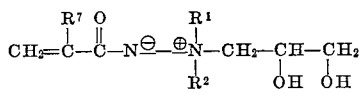

wherein:
R¹ and R² are lower alkyl;
R⁷ is H, Cl, F, Br, CN or —$C_nH_{2n+1}$ where $n$ is an integer from 1 to 4 inclusive.

18. The compound of claim 17 having the formula:

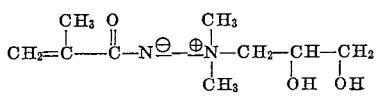

19. The addition polymer of the compound of claim 10.
20. The addition polymer of the compound of claim 14.
21. The polymer of claim 19 wherein the compound is the sole monomer.
22. The polymer of claim 19 wherein the compound is copolymerized with a comonomer selected from the group consisting of styrene, acrylonitrile, butadiene, methacrylates, acrylates, acrylamide, vinyl chloride, vinyl fluoride, vinyl acetate vinylidene chloride, vinylidene fluoride, ethylene and propylene.
23. A process for converting carboxylic acid ester groups pendant to the backbone of a polymer into pendent aminimide groups comprising coreacting said polymer with an unsymmetrical disubstituted hydrazine and, a reactive epoxide.
24. The process of claim 23 wherein the unsymmetrical disubstituted hydrazine has the formula:

wherein R¹ and R² represent the same or different alkyl, cycloalkyl or aralkyl radicals or together represent a single divalent organic radical.

25. The process of claim 23 wherein the reactive epoxide has the formula:

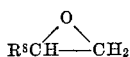

wherein R⁸ is a radical selected from the group consisting of hydrogen, alkyl, cycloalkyl, hydroxy alkyl, aryl and aralkyl.
26. The process of claim 25 wherein R⁸ is hydroxy alkyl.
27. The process of claim 23 wherein the reactive epoxide is ethylene oxide, propylene oxide or cyclohexene oxide.
28. The process of claim 23 wherein the pendant ester groups are those of the formula:

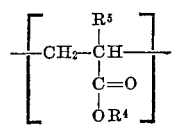

wherein R⁴ is lower alkyl and R⁵ is H, Cl, F, Br, CN or —$C_nH_{2n+1}$ where $n$ is an integer from 1 to 4 inclusive.
29. The process of claim 23 wherein the pendant ester groups are lactones.

30. The process of claim 29 wherein the pendant ester groups are:

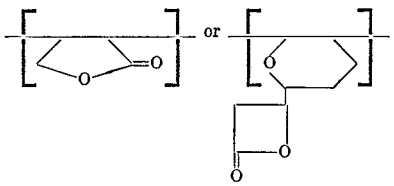

31. The process of claim 23 for producing a polymer having pendant aminimide groups comprising coreacting
(A) 1,1-dimethyl hydrazine,
(B) ethylene oxide, propylene oxide or mixtures thereof and,
(C) an addition polymer of methyl acrylate or methyl methacrylate or mixtures thereof.

32. A process for producing compounds of claim 1 comprising reacting an unsymmetrical disubstituted hydrazine of the formula:

wherein R¹ and R² represent the same or different alkyl, cycloalkyl, or aralkyl radicals or together represent a single divalent organic radical, a compound having at least one reactive epoxide moiety of the formula:

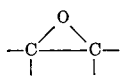

and a carboxylic acid ester having one to five saponifiable ester groups.

33. The process of claim 32 wherein R¹ and R² are lower alkyl.
34. The process of claim 32 wherein the epoxide has the formula:

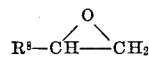

wherein R⁸ is hydrogen, alkyl, aryl, aralkyl, or alkaryl.
35. The process of claim 32 wherein the ester has the formula:

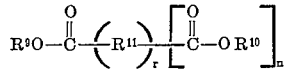

wherein R⁹ and R¹⁰ are aliphatic; R¹¹ is an organic radical; $r$ is 0 or 1; and $n$ is an integer from 0 to 4 inclusive.
36. The process of claim 32 wherein the ester has the formula:

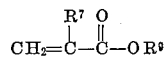

wherein R⁷ is H, Cl, F, Br, CN or $C_nH_{2n+1}$ when $n$ is an integer from 1 to 4 inclusive, and R⁹ is aliphatic.

References Cited

UNITED STATES PATENTS 2,953,570   9/1960   Rudner _____ 260—294.7
3,025,265   3/1962   Maeder _____ 260—63

JOSEPH L. SCHOFER, Primary Examiner
S. M. LEVIN, Assistant Examiner

U.S. Cl. X.R.

71—85; 117—120, 132, 139.5, 148, 155; 260—78.5, 80, 80.72, 80.73, 80.81, 82.1, 85.5, 85.7, 86.1, 87.5, 87.7, 88.1, 89.1, 89.5, 89.7, 348, 557, 558, 559, 561, 562